United States Patent
Otsuka et al.

(10) Patent No.: US 9,075,924 B2
(45) Date of Patent: Jul. 7, 2015

(54) MEMORY CARD CONTROLLER AND HOST DEVICE INCLUDING THE SAME

(71) Applicant: Panasonic Corporation, Osaka (JP)

(72) Inventors: Takeshi Otsuka, Hyogo (JP); Toshiyuki Kohri, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/155,820

(22) Filed: Jan. 15, 2014

(65) Prior Publication Data

US 2014/0258563 A1  Sep. 11, 2014

(30) Foreign Application Priority Data

Mar. 8, 2013  (JP) ................................. 2013-046322

(51) Int. Cl.
*G06F 3/00* (2006.01)
*G06F 13/38* (2006.01)

(52) U.S. Cl.
CPC ..................................... *G06F 13/385* (2013.01)

(58) Field of Classification Search
None
See application file for complete search history.

(56) References Cited

U.S. PATENT DOCUMENTS

| 7,102,671 | B1* | 9/2006 | Asnaashari ................. 348/231.9 |
| 7,850,082 | B1* | 12/2010 | Chow et al. .................... 235/451 |
| 2006/0047982 | A1* | 3/2006 | Lo et al. ......................... 713/300 |
| 2008/0010663 | A1* | 1/2008 | Wang et al. .................... 725/133 |
| 2008/0132091 | A1* | 6/2008 | Choi ................................. 439/55 |
| 2008/0167828 | A1* | 7/2008 | Terlizzi et al. ................... 702/64 |
| 2008/0209125 | A1* | 8/2008 | Chen et al. ..................... 711/115 |
| 2010/0030929 | A1* | 2/2010 | Ben-Yacov et al. ............ 710/33 |
| 2011/0238880 | A1* | 9/2011 | Hirayama et al. ............. 710/301 |
| 2012/0117315 | A1 | 5/2012 | Okada |

FOREIGN PATENT DOCUMENTS

JP  2011-28433  2/2011

* cited by examiner

*Primary Examiner* — Michael Sun
(74) *Attorney, Agent, or Firm* — Renner, Otto, Boisselle & Sklar, LLP

(57) ABSTRACT

An interface selection unit physically determines whether or not a memory card is compatible with a first transfer mode, based on the result of signal exchange with the memory card via a first interface unit, to select a first interface unit or a second interface unit. If the second interface unit is selected, a memory card control unit performs an initialization process to cause the memory card to be accessible via the second interface unit, and thereafter, logically determines whether or not the memory card is compatible with the first transfer mode, based on information read from the memory card.

10 Claims, 9 Drawing Sheets

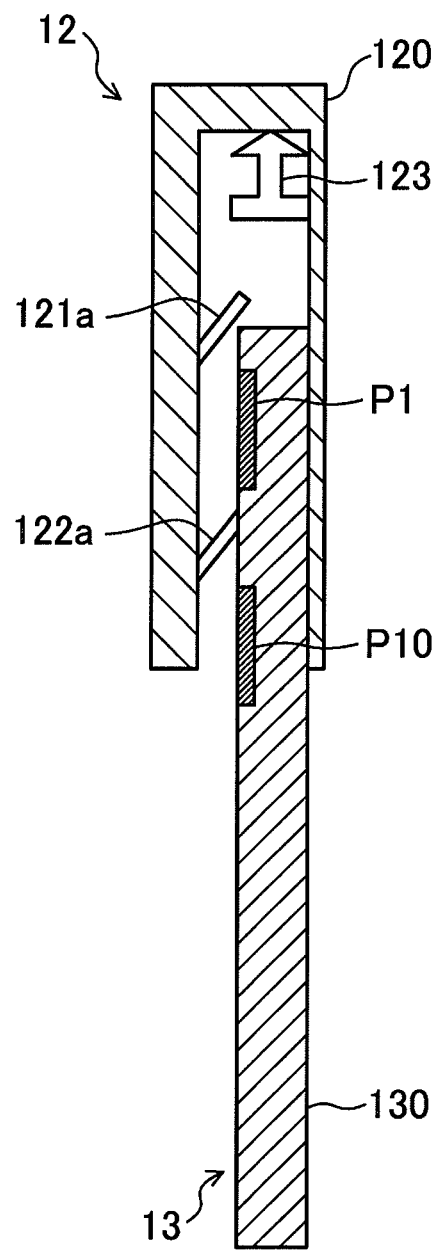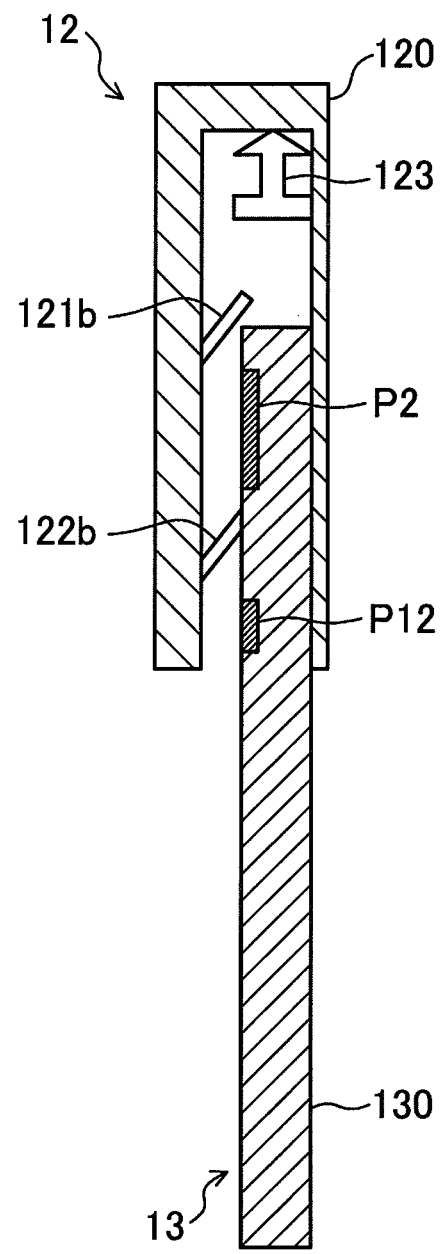

MEMORY CARD CONTROLLER AND HOST DEVICE INCLUDING THE SAME

CROSS-REFERENCE TO RELATED APPLICATION

This application claims priority to Japanese Patent Application No. 2013-046322 filed on Mar. 8, 2013, the entire disclosure of which is incorporated by reference herein.

BACKGROUND

The present disclosure relates to memory card controllers for controlling access to a memory card, and host devices including the memory card controller.

A conventional memory card includes a first group of pins and a second group of pins. The first pin group includes nine pins which are arranged in a line at a deeper end portion of the memory card in a direction in which the memory card is inserted into a memory card connector, and function as pins for parallel signal transfer in the normal transfer mode. The second pin group is used only in the high-speed transfer mode, and includes at least seven pins including at least two pair of data pins for differential serial signal transfer. In the high-speed transfer mode, two pins of the first pin group function as a pair of pins for transferring differential clock signals (see Japanese Unexamined Patent Publication No. 2011-28433).

As a standard for a secure digital (SD) card, which is a type of memory card, for example, ultra high Speed-II (UHS-II) is known, which is a high-speed differential interface standard which specifies high-speed data transfer having a maximum rate of 312 MB/s.

SUMMARY

The present disclosure describes implementations of a technique of improving the stability of an initialization process to allow a memory card to operate in a desired transfer mode, where a push-push type memory card connector is used.

An example memory card controller according to the present disclosure includes a first interface unit configured to perform signal transfer in a first transfer mode, a second interface unit configured to perform signal transfer in a second transfer mode, an interface selection unit configured to physically determine whether or not a memory card is compatible with the first transfer mode, based on a result of signal exchange with the memory card via the first interface unit, and select the first interface unit if the result of the determination is positive and the second interface unit if the result of the determination is negative, and a memory card control unit configured to control access to the memory card via the first or second interface unit selected by the interface selection unit. The memory card control unit, when the interface selection unit selects the second interface unit, performs an initialization process for the second transfer mode to cause the memory card to be accessible via the second interface unit, and thereafter, reads predetermined information from the memory card, and based on the read information, logically determines whether or not the memory card is compatible with the first transfer mode.

According to the present disclosure, even if an incorrect physical determination has been made as to whether or not a memory card is compatible with the first transfer mode, the occurrence of the incorrect determination is logically verified. Therefore, for example, when a memory card compatible with a high-speed transfer mode is inserted into a push-push type memory card connector and continues to be pushed or pressed for a long period of time, the situation that the memory card is initialized and operated in the normal transfer mode can be reduced or prevented.

BRIEF DESCRIPTION OF THE DRAWINGS

FIG. 3A is a cross-sectional view taken along line A-A of FIG. 2, showing a positional relationship between the ejected memory card and the memory card connector.

FIG. 3B is a cross-sectional view taken along line B-B of FIG. 2, showing a positional relationship between the ejected memory card and the memory card connector.

DETAILED DESCRIPTION

Embodiments will be described in detail hereinafter with reference to the accompanying drawings. To avoid unnecessarily obscuring the present disclosure, well-known features may not be described or substantially the same elements may not be redundantly described, for example. This is for ease of understanding.

The drawings and the following description are provided to enable those skilled in the art to fully understand the present disclosure and are in no way intended to limit the scope of the present disclosure as set forth in the appended claims.

An embodiment will now be described with reference to FIGS. 1-10.

(Embodiment)

[1. Configuration]

[1-1. Configuration of Host Device]

Figure 1:
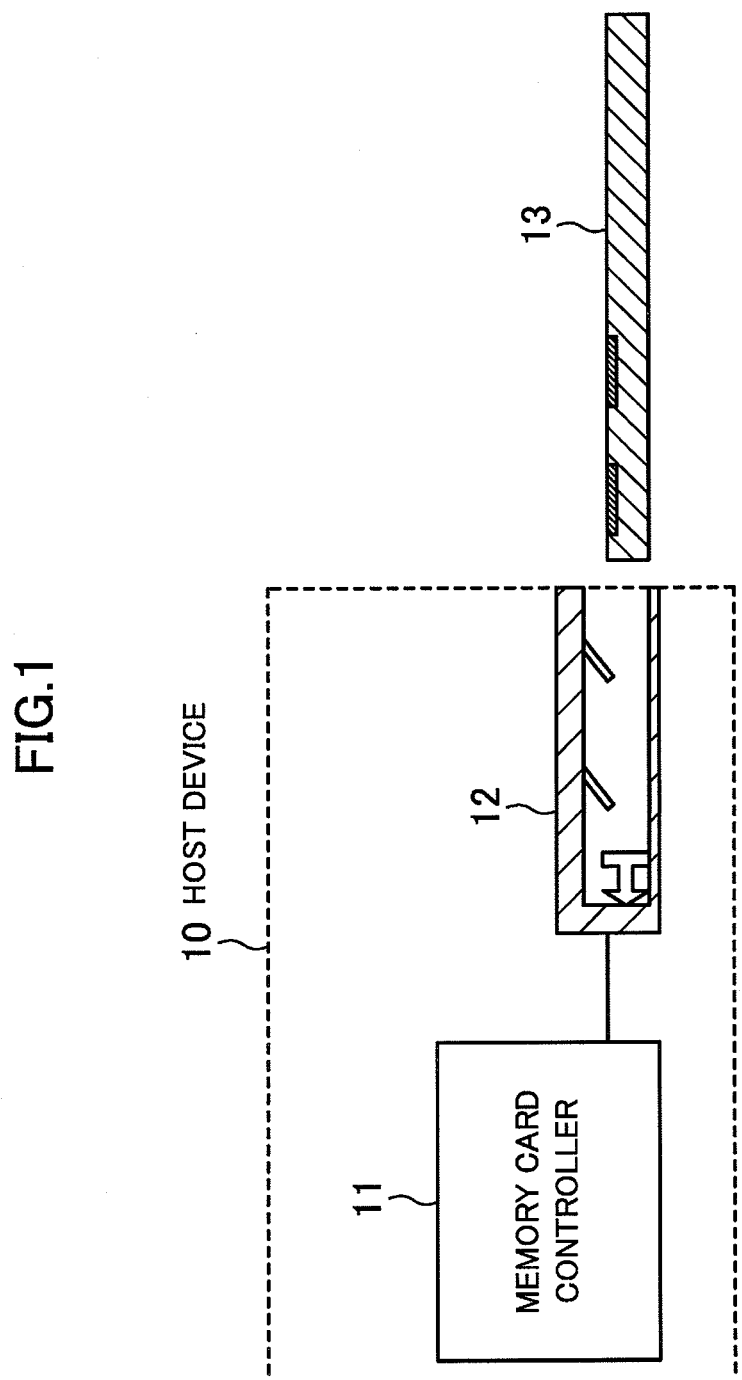
FIG. 1 is a diagram showing a schematic configuration of a host device including a memory card controller according to an embodiment, along with a memory card which is to be loaded thereto.

FIG. 1 shows a schematic configuration of a host device including a memory card controller according to an embodiment, along with a memory card which is to be loaded thereto. The host device 10 of FIG. 1 includes a memory card controller 11 and a push-push type memory card connector 12. When a memory card 13 is inserted into the memory card connector 12, the memory card controller 11 and the memory card 13 are connected together via the memory card connector 12.

In FIG. 1, it is assumed that the memory card connector 12 is an UHS-II-compliant connector, and the memory card 13 is an UHS-II-compliant card (hereinafter referred to as a "high-speed memory card"). Note that the UHS-II-compliant memory card connector 12 also accepts non-UHS-II-compliant cards (hereinafter referred to as "conventional memory cards") which operate only in the normal transfer mode.

[1-2. Configurations of Memory Card and Memory Card Connector]

Figure 2:
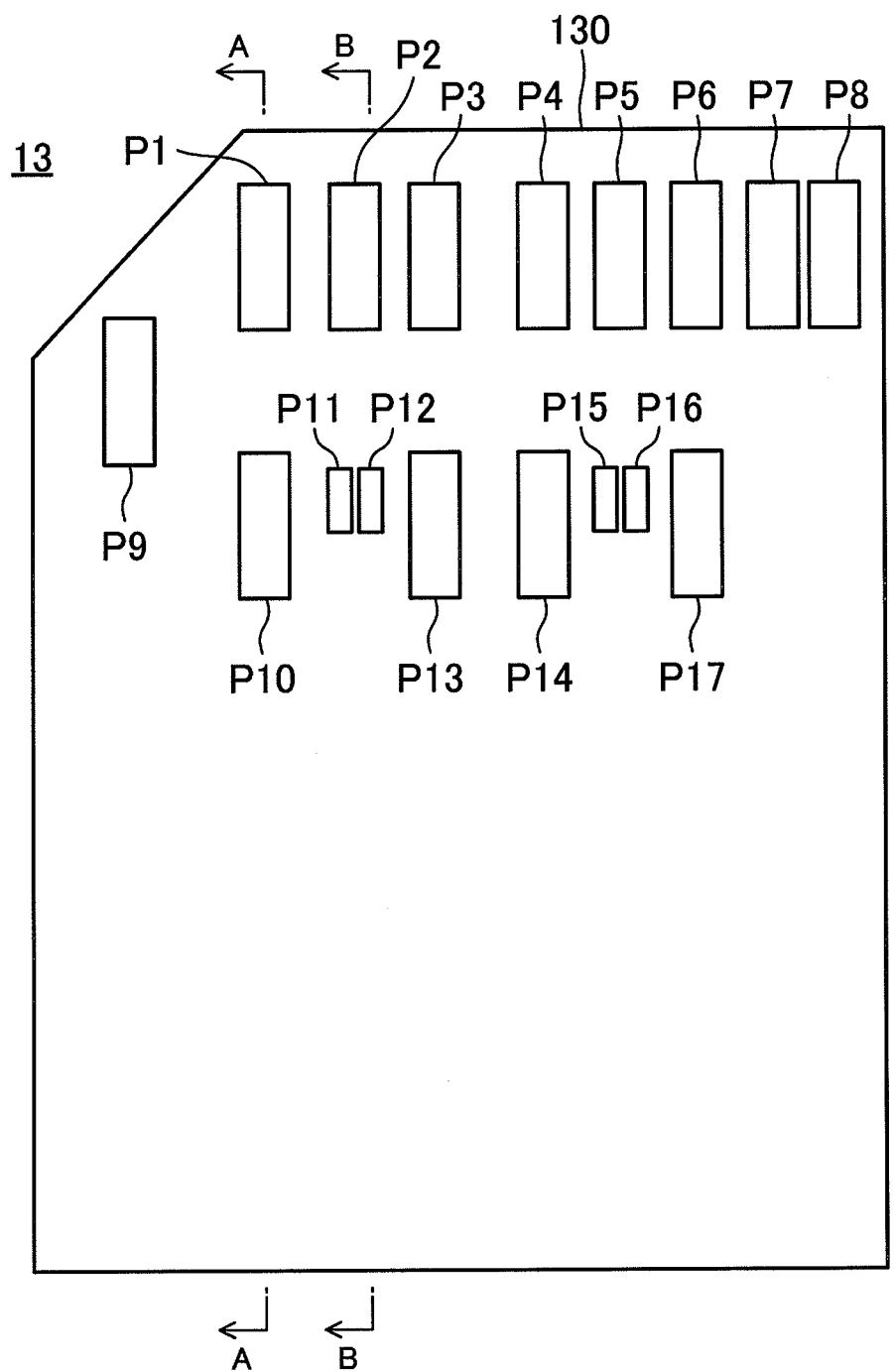
FIG. 2 is a view of the back side of the memory card of FIG. 1.

FIG. 2 is a view of the back side of the memory card 13 of FIG. 1 which is a high-speed memory card, showing a pin layout thereof. The memory card 13 of FIG. 2 includes a first group of pins P1-P9 (also referred to as "first pins") and a second group of pins P10-P17 (also referred to as "second pins") on a housing 130. The first pins P1-P9 are arranged in a line at a deeper end portion of the memory card 13 in a direction in which the memory card 13 is inserted into the memory card connector 12, and function as pins for parallel signal transfer in the normal transfer mode. The second pins P10-P17 are arranged in another line which is located further inside than the line of the first pins P1-P9, and are used only in the high-speed transfer mode. Of these pins, the pins P11 and P12 are a pair of pins for transferring differential serial output data signals D0+ and D0−, and the pins P15 and P16 are another pair of pins for transmitting differential serial input data signals D1+ and D1−. The pins P10, P13, P14, and P17 are each a power supply pin or a ground pin. In the high-speed transfer mode, the pins P7 and P8 of the first pin group function as a pair of pins for transmitting differential clock signals RCLK+ and RCLK−. The high-speed transfer mode data pins P11, P12, P15, and P16 are shorter than the other pins in the direction in which the memory card 13 is inserted in order to reduce or prevent a deterioration in signal quality during high-speed data transfer. Conventional memory cards include only the first group of pins P1-P9, but not the second group of pins P10-P17 of FIG. 2.

FIG. 3A is a cross-sectional view taken along line A-A of FIG. 2. FIG. 3B is a cross-sectional view taken along line B-B of FIG. 2, showing a positional relationship between the memory card 13 and the memory card connector 12 before the memory card 13 is pushed into the memory card connector 12. A reference character 120 indicates a housing of the memory card connector 12. Reference characters 121a and 121b indicate terminals on a first line of the memory card connector 12, which correspond to the pins P1 and P2, respectively. Reference characters 122a and 122b indicate terminals on a second line of the memory card connector 12, which correspond to the pins P10 and P12, respectively. A reference character 123 indicates a spring unit. The terminals 121a and 121b on the first line are located deeper in the memory card connector 12 than the terminals 122a and 122b on the second line. The spring unit 123 is compressed when the memory card 13 is being pushed or pressed into or against the memory card connector 12, and returns to the original shape when the memory card 13 is released from the compressed state. As shown in FIGS. 3A and 3B, when the memory card 13 is ejected, the spring unit 123 is relaxed and the memory card 13 is not in contact with the spring unit 123. None of the pins P1, P2, P10, and P12 of the memory card 13 is in contact with the corresponding one of the terminals 121a, 121b, 122a, and 122b of the memory card connector 12.

Figure 4A:
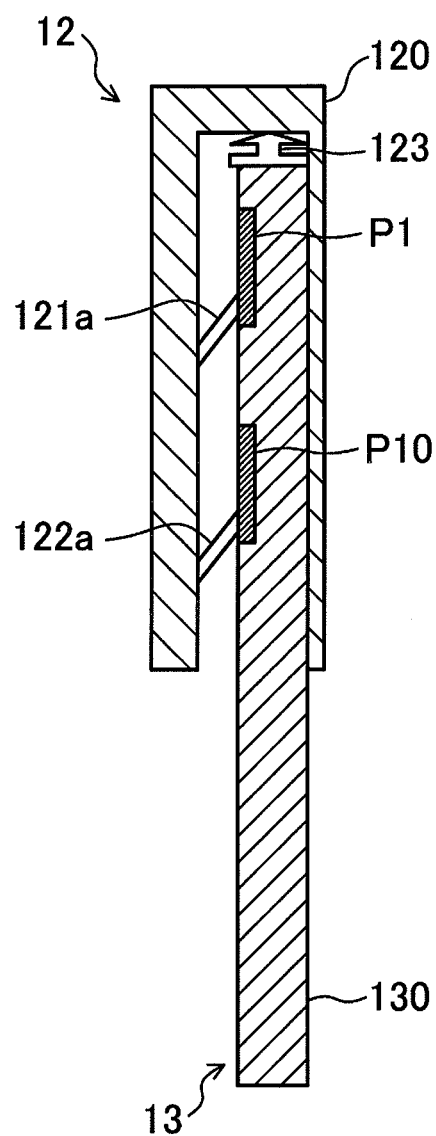
FIG. 4A is a cross-sectional view taken along line A-A of FIG. 2, showing a positional relationship between the pushed memory card and the memory card connector.
Figure 4B:
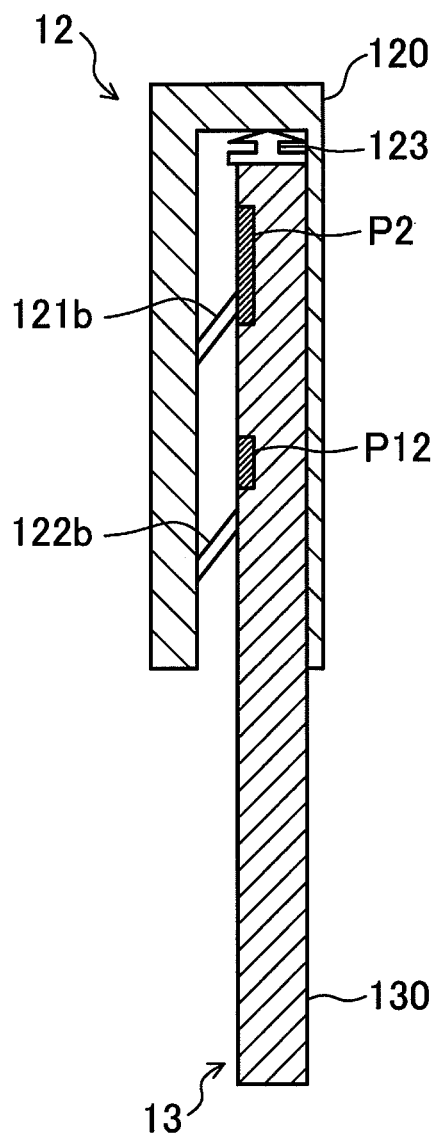
FIG. 4B is a cross-sectional view taken along line B-B of FIG. 2, showing a positional relationship between the pushed memory card and the memory card connector.

FIG. 4A is a cross-sectional view taken along line A-A of FIG. 2. FIG. 4B is a cross-sectional view taken along line B-B of FIG. 2, showing a positional relationship between the memory card 13 and the memory card connector 12 when the memory card 13 is being pushed into or pressed against the memory card connector 12. Because the spring unit 123 is compressed, the memory card 13 is pushed down into a deep portion of the memory card connector 12. Therefore, as shown in FIG. 4A, the pin P1 on the first line and the pin P10 on the second line of the memory card 13 come into contact with the respective corresponding terminals 121a and 122a of the memory card connector 12. On the other hand, as shown in FIG. 4B, while the pin P2 on the first line of the memory card 13 comes into contact with the corresponding terminal 121b of the memory card connector 12, the pin P12 on the second line of the memory card 13 does not come into contact with the corresponding terminal 122b of the memory card connector 12, because the pin P12 is short. As shown in FIG. 4B, when the memory card 13 is being pushed into or pressed against the memory card connector 12, none of the high-speed transfer mode data pins P11, P15, and P16 is in contact with the corresponding terminal of the memory card connector 12, similar to the pin P12.

Figure 5A:
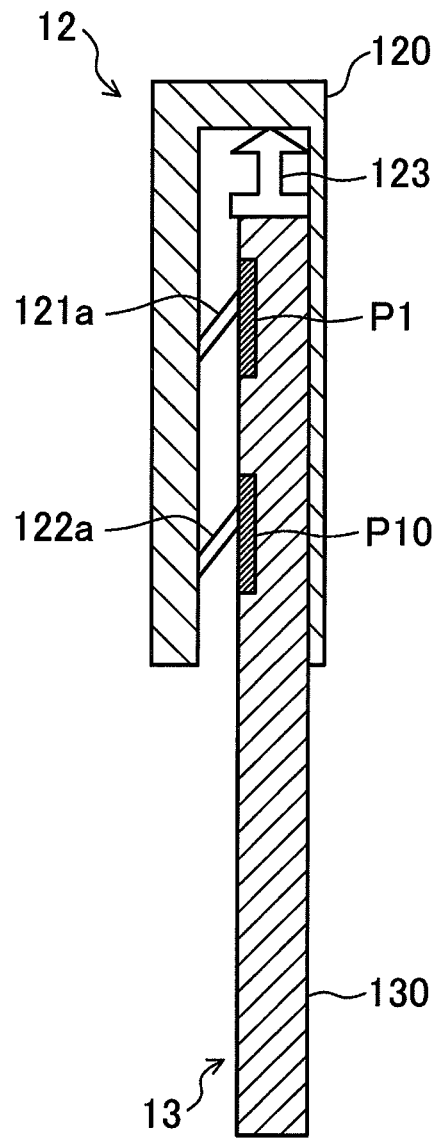
FIG. 5A is a cross-sectional view taken along line A-A of FIG. 2, showing a positional relationship between the loaded memory card and the memory card connector.
Figure 5B:
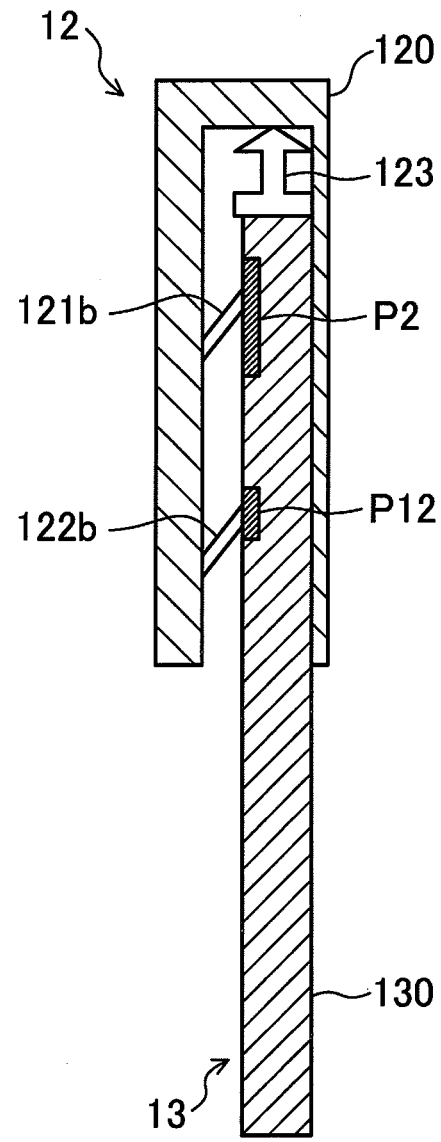
FIG. 5B is a cross-sectional view taken along line B-B of FIG. 2, showing a positional relationship between the loaded memory card and the memory card connector.

FIG. 5A is a cross-sectional view taken along line A-A of FIG. 2. FIG. 5B is a cross-sectional view of B-B of FIG. 2, showing a relationship between the memory card 13 and the memory card connector 12 after the memory card 13 has been released from the compressed state. When the memory card 13 is released from the compressed state, the spring unit 123 returns from the compressed state to the original relaxed state, resulting in a memory card loaded state in which the spring unit 123 and the memory card 13 are in contact with each other. As shown in FIG. 5A, the pin P1 on the first line and the pin P10 on the second line of the memory card 13 are in contact with the respective corresponding terminals 121a and 122a of the memory card connector 12. As shown in FIG. 5B, the pin P2 on the first line and the pin P12 on the second line of the memory card 13 are in contact with the respective corresponding terminals 121b and 122b of the memory card connector 12.

Figure 6:
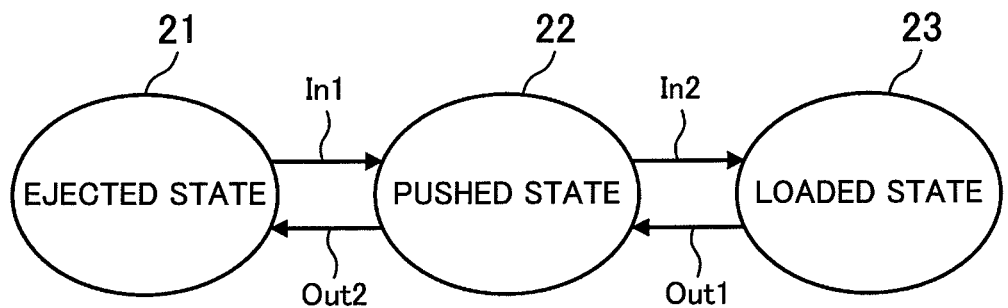
FIG. 6 is a state transition diagram of the memory card of FIG. 1.

FIG. 6 is a state transition diagram of the memory card 13 of FIG. 1. In FIG. 6, a reference character In1 indicates a step of pushing the memory card 13 into the memory card connector 12 from an ejected state 21 shown in FIGS. 3A and 3B. A reference character In2 indicates a step of ending a pushed state 22 shown in FIGS. 4A and 4B in order to cause the memory card 13 to go to a loaded state 23 shown in FIGS. 5A and 5B. A reference character Out1 indicates a step of pushing the memory card 13 again to cause the memory card 13 to go from the loaded state 23 to the pushed state 22. A reference character Out2 indicates a step of ending the pushed state 22 to cause the memory card 13 to go to the ejected state 21.

[1-3. Configuration of Memory Card Controller]

Figure 7:
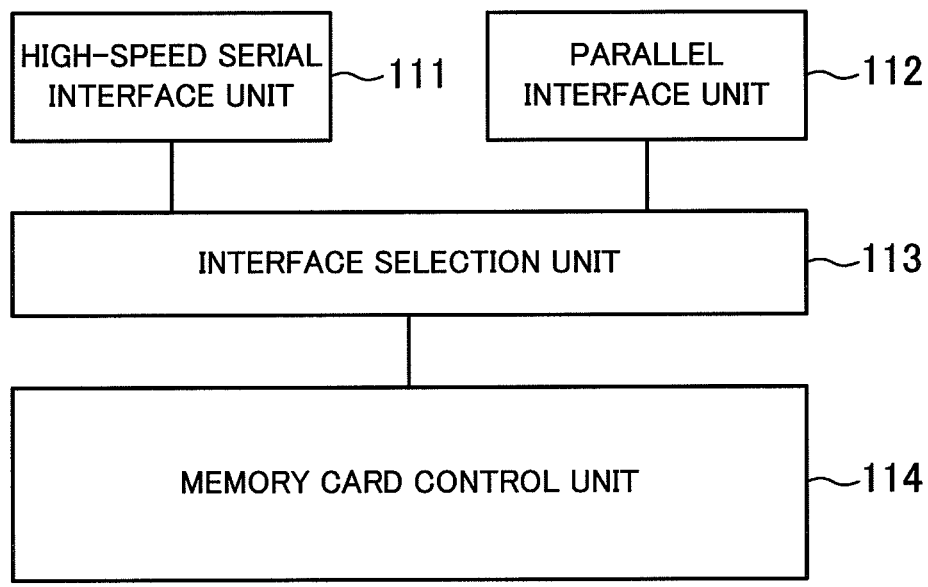
FIG. 7 is a block diagram showing a detailed configuration of the memory card controller of FIG. 1.

FIG. 7 shows a detailed configuration of the memory card controller 11 of FIG. 1. The memory card controller 11 of FIG. 7 includes a high-speed serial interface unit 111, a parallel interface unit 112, an interface selection unit 113 which selects one of the high-speed serial interface unit 111 and the parallel interface unit 112, and a memory card control unit 114 which controls access to the memory card 13 via the selected high-speed serial interface unit 111 or parallel interface unit 112. The memory card control unit 114, which includes a micro-processing unit (MPU), is operated according to a program shown in a flowchart described below.

[2. Operation of Memory Card Controller]

[2-1. First Example Operation]

Figure 8:
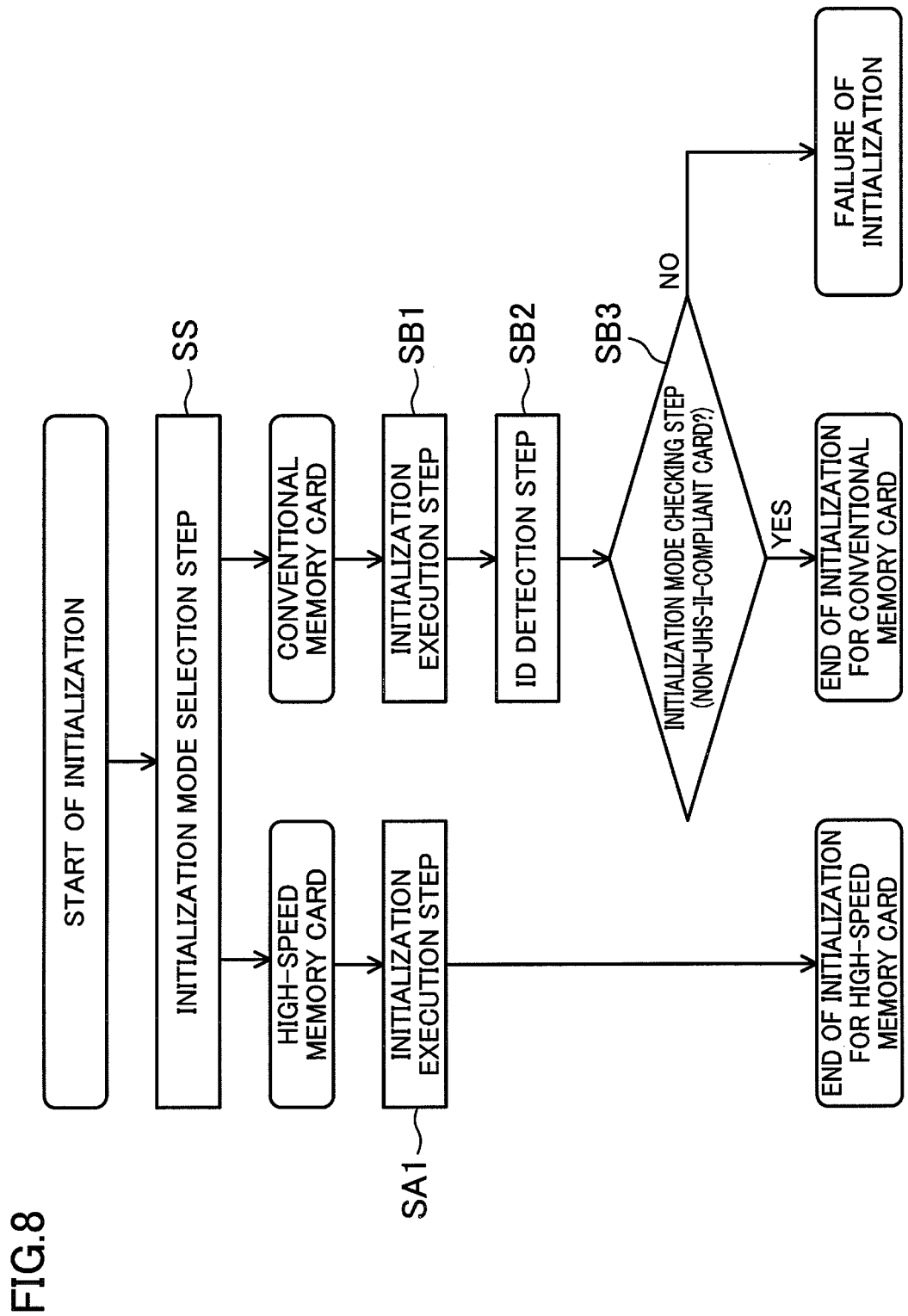
FIG. 8 is a flowchart showing example operation of the memory card controller of FIG. 7.
Figure 9:
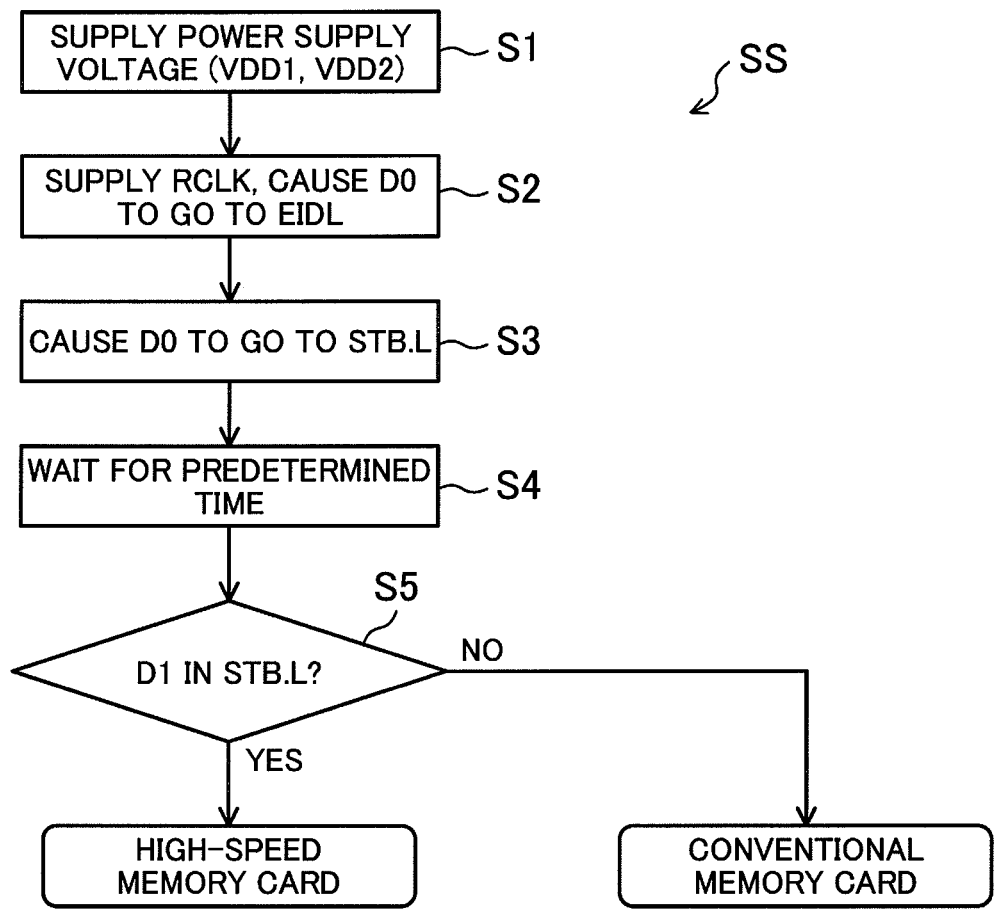
FIG. 9 is a flowchart showing details of an initialization mode selection step of FIG. 8.

FIG. 8 is a flowchart showing example operation of the memory card controller 11 of FIG. 7. When a high-speed memory card or a conventional memory card is inserted into the memory card connector 12, the memory card controller 11 performs an initialization process shown in FIG. 8. FIG. 9 shows details of an initialization mode selection step SS of FIG. 8.

Firstly, the initialization mode selection step SS will be described in detail with reference to FIG. 9. In step S1, the memory card controller 11 supplies a power supply voltage (VDD1, VDD2) to a memory card inserted into the memory card connector 12. In step S2, the memory card controller 11 supplies, to the memory card, high-speed transfer mode differential clock signals RCLK+ and RCLK−, and differential serial output data signals D0+ and D0− in an EIDL state (both the signals D1+ and D0− are low), using the high-speed serial interface unit 111. Next, in step S3, the memory card controller 11 causes the differential serial output data signals D0+ and D0− to go from the EIDL state to an STB.L state (the signal D0+ is low and the signal D0− is high), using the high-speed serial interface unit 111. While this state is maintained, the memory card controller 11 is in the wait state for a predetermined period of time (step S4). Thereafter, in step S5, the memory card controller 11 determines whether or not the differential serial input data signals D1+ and D1− have gone to the STB.L state (the signal D1+ is low and the signal D1− is high), using the interface selection unit 113. As a result, if the differential serial input data signals D1+ and D1− go to the STB.L state within the predetermined period of time, the memory card controller 11 determines that a high-speed memory card has been inserted into the memory card connector 12, and selects the high-speed serial interface unit 111. Otherwise, the memory card controller 11 determines that a conventional memory card has been inserted into the memory card connector 12, and selects the parallel interface unit 112.

As described above, based on the result of signal exchange with a memory card via the high-speed serial interface unit 111, the interface selection unit 113 physically determines whether or not the memory card inserted into the memory card connector 12 is compatible with the high-speed transfer mode. If the determination result is positive, the interface selection unit 113 selects the high-speed serial interface unit 111. Otherwise, the interface selection unit 113 selects the parallel interface unit 112. Such a process of the initialization mode selection step SS is mainly performed by hardware, i.e., the high-speed serial interface unit 111 and the interface selection unit 113. Therefore, the process of the initialization mode selection step SS can be completed within 1 ms.

Incidentally, when a conventional memory card is inserted into the memory card connector 12, the memory card controller 11 does not receive the differential serial input data signals D1+ and D1− of the STB.L state, because the memory card does not have the data pins P11, P12, P15, and P16 for the high-speed transfer mode. Therefore, the memory card controller 11 correctly determines that the memory card is a conventional memory card. On the other hand, when a high-speed memory card is inserted into the memory card connector 12 and the memory card immediately goes to the loaded state 23 of FIG. 6, the memory card controller 11 correctly determines that the memory card is a high-speed memory card because, as described in FIG. 5B, the data pins P11, P12, P15, and P16 for the high-speed transfer mode can be used. However, even when a high-speed memory card is inserted into the memory card connector 12, then if the pushed state 22 of FIG. 6 is continued for a long time and therefore the memory card does not go to the loaded state 23, the memory card controller 11 incorrectly determines that the memory card is a conventional memory card because, as described in FIG. 4B, the data pins P11, P12, P15, and P16 for the high-speed transfer mode cannot be used. The present disclosure provides a solution to this incorrect determination problem.

Referring back to FIG. 8, a process which is performed by the memory card control unit 114 after the initialization mode selection step SS will be described.

The memory card control unit 114, when determining that a high-speed memory card has been inserted into the memory card connector 12, selects an initialization execution step SA1 for the high-speed memory card. In the initialization execution step SA1, synchronization of the high-speed serial interface unit 111 is established, and parameters (a packet size, a data frequency) for high-speed serial transfer are determined, and thereafter, initialization processes, such as loading of firmware for the high-speed memory card, creation of memory control-related tables (e.g., a logical-physical address conversion table etc.), etc., are performed. As a result, the memory card control unit 114 is allowed to access the memory card via the high-speed serial interface unit 111.

On the other hand, when determining that a conventional memory card has been inserted into the memory card connector 12, the memory card control unit 114 selects an initialization execution step SB1 for the conventional memory card. As a result, the memory card control unit 114 is allowed to access the memory card via the parallel interface unit 112. Note that the initialization execution steps SA1 and SB1 are mostly performed by software, and therefore, it takes about one second to complete each of the steps.

Next, an ID detection step SB2 and an initialization mode checking step SB3 are performed to logically determine whether or not the memory card which has been initialized as a conventional memory card is a high-speed memory card. For example, a predetermined register which indicates whether or not the memory card is a high-speed memory card may be read. Alternatively, the serial number of the memory card may be read, and based on the serial number, it may be determined whether or not the memory card is a high-speed memory card. Because the initialization execution step SB1 for enabling the parallel interface unit 112 has been performed, it can be logically determined whether or not the memory card is a high-speed memory card, by reading information which is previously stored in the memory card.

If the memory card which has been initialized as a conventional memory card is not a high-speed memory card, the initialization process is successful. Conversely, if the memory card which has been initialized as a conventional memory card is a high-speed memory card, the initialization process is not successful. If the initialization process is not successful, the user may, for example, be informed of this by means of a warning lamp (not shown) provided in the host device 10, and therefore, may remove the memory card from the memory card connector 12, and insert the memory card again, so that the initialization process may be retried.

As described above, when the interface selection unit 113 selects the parallel interface unit 112, the memory card control unit 114 performs an initialization process for the normal transfer mode so that a memory card can be accessed via the parallel interface unit 112, and thereafter, reads predetermined information from the memory card, and based on the read information, logically determines whether or not the memory card is compatible with the high-speed transfer mode. Therefore, even if a high-speed memory card is incorrectly physically determined to be a conventional memory card, the occurrence of the incorrect determination is logically verified.

When the incorrect determination occurs, then if it is determined that the initialization process has failed, the memory card may be removed and then inserted again, whereby the situation that the memory card is initialized and operated in an incorrect mode can be reduced or prevented.

[2-2. Second Example Operation]

Figure 10:
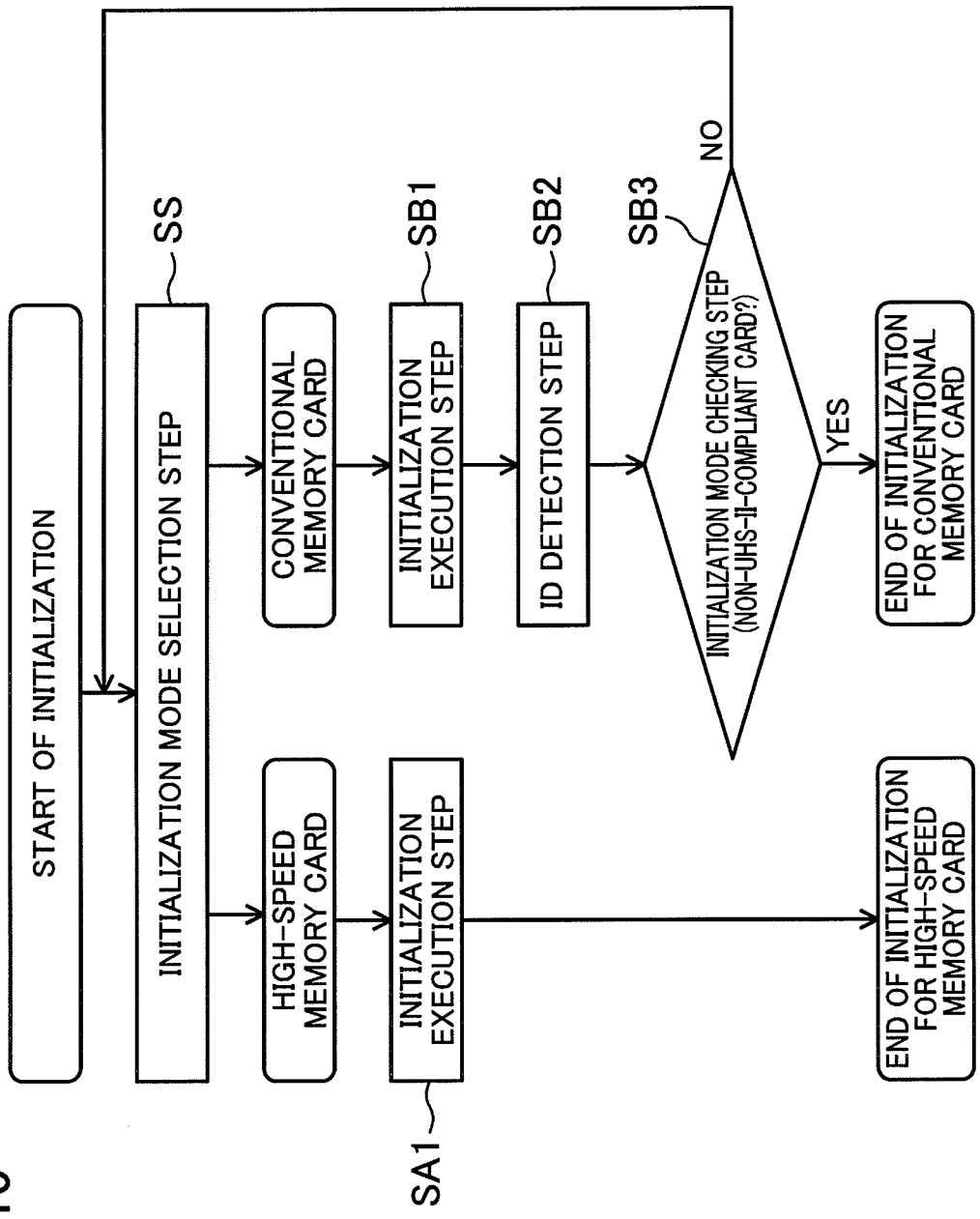
FIG. 10 is a flowchart showing another example operation of the memory card controller of FIG. 7.

FIG. 10 is a flowchart showing another example operation of the memory card controller 11 of FIG. 7. As shown in FIG. 10, the memory card controller 11, when logically determining that a memory card which has been initialized as a conventional memory card is a high-speed memory card, automatically retries the initialization process instead of determining that the initialization process has failed. As a result, when the user stops pushing the high-speed memory card after the high-speed memory card has been in the pushed state 22 for a long period of time, the high-speed memory card goes from the pushed state 22 to the loaded state 23, and therefore, the high-speed memory card is correctly physically determined by the initialization mode selection step SS to be a high-speed memory card, and the initialization execution step SA1 for the high-speed memory card is selected, so that the correct initialization process is necessarily performed.

Therefore, if a memory card is logically determined to be compatible with the high-speed transfer mode after having been physically determined not to be compatible with the high-speed transfer mode and subjected to the initialization process for the normal transfer mode, the memory card control unit 114 necessarily performs the initialization process for the high-speed transfer mode so that the memory card can be accessed via the high-speed serial interface unit 111. Therefore, the user can reduce or avoid the troublesome situation that the memory card is removed from and then inserted again into the memory card connector 12.

[3. Advantages Etc.]

According to the above embodiment, when a memory card compatible with a high-speed transfer mode is used in an application which needs high-speed data transfer, the memory card can be reliably initialized for the high-speed transfer mode, whereby irregular factors in operation due to variations in handling which occur when the memory card is inserted can be reduced or prevented.

(Other Embodiments)

In the foregoing description, an embodiment of the technique disclosed herein has been illustrated. The present disclosure is not limited to this. The present disclosure is applicable to the embodiment to which changes, replacements, additions, deletions, etc. have been made. The elements described in the embodiment may be combined to obtain a new embodiment.

Therefore, other embodiments will now be described.

In the initialization mode selection step SS of this embodiment, it is determined whether or not a memory card inserted into the memory card connector 12 is compatible with a high-speed transfer mode, by determining whether or not the data signals D1+ and D1− received from the memory card go to the STB.L state. The present disclosure is not limited to this, if the presence or absence of an interface needed for the high-speed transfer mode can be determined according to a predetermined protocol for serial data communication.

Also, in the foregoing description, pins of the memory card 13 which are not in contact with the connector terminal when the memory card 13 is pushed into the memory card connector 12 are the data pins P11, P12, P15, and P16 for the high-speed transfer mode. The present disclosure is not limited to this.

Also, in the foregoing description, the pins P10-P17 used only for the high-speed transfer mode are located further inside the memory card 13. The present disclosure is applicable to any arrangement that causes the pins of the memory card 13 not to be in contact with a terminal of the memory card connector 12 when the memory card 13 is pushed into the memory card connector 12.

As described above, embodiments of the technique disclosed herein have been illustrated. To do so, the accompanying drawings and the detailed description have been provided.

Therefore, the components described in the drawings and the detailed description may include not only components essential for achieving the present disclosure, but also non-essential components which are used to illustrate the above technique. Therefore, the non-essential components should not be immediately considered as being essential because those components are described in the drawings and the detailed description.

The above embodiments are for the purpose of illustration of the technique of the present disclosure, and therefore, various changes, replacements, additions, deletions, etc., can be made thereto within the scope of the claims or equivalents thereof.

The present disclosure is, for example, effective for a host device which is applicable to a memory card in which pins for serial data transfer are newly provided while being maintained compatible with conventional memory cards, and particularly includes a push-push type memory card connector. The present disclosure is applicable to fields which need high-speed data transfer, such as notebook PCs, digital cameras, etc.

What is claimed is:

1. A memory card controller for controlling access to a memory card, comprising:
    a first interface unit configured to perform signal transfer in a first transfer mode;
    a second interface unit configured to perform signal transfer in a second transfer mode;
    an interface selection unit configured to physically determine whether or not the memory card is compatible with the first transfer mode, based on a result of signal exchange with the memory card via the first interface unit, and select the first interface unit if the result of the determination is positive and the second interface unit if the result of the determination is negative; and
    a memory card control unit configured to control access to the memory card via the first or second interface unit selected by the interface selection unit,
    wherein the memory card control unit, when the interface selection unit selects the second interface unit, performs an initialization process for the second transfer mode to cause the memory card to be accessible via the second interface unit, and thereafter, reads predetermined information from the memory card, and based on the read information, logically determines whether or not the memory card is compatible with the first transfer mode.

2. The memory card controller of claim 1, wherein the memory card control unit, when the interface selection unit selects the first interface unit, performs an initialization process for the first transfer mode to cause the memory card to be accessible via the first interface unit.

3. The memory card controller of claim 1, wherein the first interface unit is a high-speed serial interface unit, and the second interface unit is a parallel interface unit.

4. The memory card controller of claim 1, wherein when the memory card is logically determined to be compatible with the first transfer mode after having been physically determined not to be compatible the first transfer mode and subjected to the initialization process for the second transfer mode, the memory card control unit determines that the initialization process has failed.

5. The memory card controller of claim 1, wherein when the memory card is logically determined to be compatible with the first transfer mode after having been physically determined not to be compatible the first transfer mode and subjected to the initialization process for the second transfer mode, the memory card control unit performs an initialization process for the first transfer mode to cause the memory card to be accessible via the first interface unit.

6. A host device comprising: the memory card controller of claim 1; and a push-push type memory card connector configured to connect the memory card controller with a memory card.

7. The host device of claim 6, wherein the memory card connector includes a first terminal corresponding to a first pin of the memory card for the first transfer mode, and a second terminal corresponding to a second pin of the memory card for the second transfer mode, and when the memory card is compatible with the first transfer mode and the memory card is pushed deep into the memory card connector, the first pin of the memory card does not come into contact with the first terminal and the second pin of the memory card comes into contact with the second terminal.

8. The host device of claim 7, wherein the first pin is shorter than the second pin in a direction in which the memory card is inserted.

9. The host device of claim 8, wherein the first pin is a serial data pin.

10. The host device of claim 7, wherein the second terminal is located deeper in the memory card connector than the first terminal.

* * * * *